(12) United States Patent
Beh et al.

(10) Patent No.: US 11,932,560 B2
(45) Date of Patent: Mar. 19, 2024

(54) ELECTROCHEMICAL DEVICE FOR CREATION OF PH GRADIENTS

(71) Applicant: Palo Alto Research Center Incorporated, Palo Alto, CA (US)

(72) Inventors: Eugene S. Beh, Portola Valley, CA (US); Mahati Chintapalli, Berkeley, CA (US); Stephen Matthew Meckler, Mountain View, CA (US)

(73) Assignee: XEROX CORPORATION, Norwalk, CT (US)

( * ) Notice: Subject to any disclaimer, the term of this patent is extended or adjusted under 35 U.S.C. 154(b) by 285 days.

(21) Appl. No.: 17/214,404

(22) Filed: Mar. 26, 2021

(65) Prior Publication Data
US 2022/0306497 A1    Sep. 29, 2022

(51) Int. Cl.
| | | |
|---|---|---|
| C02F 1/467 | (2023.01) | |
| B01D 53/32 | (2006.01) | |
| C02F 1/461 | (2023.01) | |
| C02F 1/66 | (2023.01) | |
| C02F 101/10 | (2006.01) | |
| C02F 103/08 | (2006.01) | |

(52) U.S. Cl.
CPC .......... *C02F 1/4672* (2013.01); *B01D 53/326* (2013.01); *C02F 1/46109* (2013.01); *C02F 1/4676* (2013.01); *C02F 1/66* (2013.01); *B01D 2257/504* (2013.01); *C02F 2001/46133* (2013.01); *C02F 2001/46161* (2013.01); *C02F 2101/10* (2013.01); *C02F 2103/08* (2013.01); *C02F 2201/46145* (2013.01); *C02F 2209/003* (2013.01); *C02F 2209/06* (2013.01)

(58) Field of Classification Search
CPC ............ C02F 2201/46; C02F 2201/461; C02F 2201/46105; C02F 1/4618; C02F 2001/46185; C02F 2001/4619
See application file for complete search history.

(56) References Cited

U.S. PATENT DOCUMENTS

| | | |
|---|---|---|
| 11,005,108 B2 | 5/2021 | Surendranath et al. |
| 2015/0076390 A1 | 3/2015 | Kloeppner et al. |
| 2015/0361206 A1 | 12/2015 | Shukla et al. |
| 2017/0113951 A1* | 4/2017 | Su .......................... C02F 1/469 |

(Continued)

OTHER PUBLICATIONS

English Translation and Original patent publication KR-101191480 (Year: 2012).*

(Continued)

*Primary Examiner* — Salil Jain
(74) *Attorney, Agent, or Firm* — Mueting Raasch Group

(57) ABSTRACT

A membraneless electrochemical device comprises a fluid feed stream input to the membraneless electrochemical cell, a first electrode, and a second electrode. The first electrode comprises a first redox-active material configured to have a proton-coupled oxidation reaction with a first portion of the fluid feed stream, and the second electrode comprises a second redox-active material configured to have a proton-coupled reduction reaction with a second portion of the fluid feed stream. The first portion and the second portion of the fluid feed stream are separated. A first effluent stream comprises the first portion and has a first pH, and a second effluent stream comprises the second portion and has a second pH, different from the first pH.

20 Claims, 6 Drawing Sheets

(56) References Cited

U.S. PATENT DOCUMENTS

2021/0009441 A1     1/2021   Hatton et al.
2021/0060484 A1*   3/2021   Aziz ................. B01D 53/1493

OTHER PUBLICATIONS

Esposito, "Membraneless Electrolyzers for Low-Cost Hydrogen Production in a Renewable Energy Future", Joule 1, Dec. 20, 2017, pp. 651-658.
Nam et al., "Electrochemical Desalination Using Bi/BiOCl Electrodialysis Cells", ACS Sustainable Chem. Eng., vol. 6, 2018, pp. 15455-15462.
European Patent Application No. 22160574.4; Office Action dated Dec. 15, 2022.

* cited by examiner

ELECTROCHEMICAL DEVICE FOR CREATION OF PH GRADIENTS

TECHNICAL FIELD

This disclosure relates generally to systems for forming a pH gradient within a fluid stream and methods of operating the same.

BACKGROUND

The world's oceans absorb carbon dioxide ($CO_2$) from the atmosphere as part of the carbon cycle. As atmospheric carbon dioxide levels have increased, so has the amount of $CO_2$ absorbed by the oceans. When carbon dioxide dissolves in seawater, it reacts to create carbonic acid. The carbonic acid in turn releases hydrogen ions (W), forming carbonate ($CO_3^{-2}$) and bicarbonate ($HCO_3^-$) ions. The pH of seawater, which determines the relative fractions of dissolved carbon dioxide, carbonate, and bicarbonate, is typically around 8.3. This means that the majority of dissolved total carbon in seawater is in the form of bicarbonate. Accumulation of these reactions over time has increased the acidity of the ocean's seawater, negatively affecting oceanic plant and animal life. Removing carbon dioxide from the oceans would provide capacity for the oceans to remove further carbon dioxide from the atmosphere as well as help to restore the pH balance of our oceans' seawater. Moreover, the removed carbon dioxide could be sequestered and/or otherwise used in a variety of industries such as building materials (e.g., concrete), chemicals for commodities (e.g., polymers, potash), fuels (e.g., liquid hydrocarbons), carbon materials (e.g., graphene, nanotubes, etc.), and aquaculture.

One way to achieve carbon dioxide capture from ocean water is by first increasing the water's acidity to release dissolved bicarbonate and carbonate ions as carbon dioxide, and then increasing the alkalinity to restore the pH. Another method for raising the alkalinity of ocean water is to mix acidified water with, as an example, a fine suspension of calcium carbonate, which converts the calcium carbonate into calcium bicarbonate, while basified water is released into the ocean. In place of calcium carbonate of various grades, limestone or other carbonate-rich minerals can be added instead. The cation in these reactions does not have to be calcium; minerals rich in magnesium carbonate may also be used. Either method can be accomplished using bipolar membrane electrodialysis, which can produce an acidified and an alkaline stream. However, the production of high concentrations of hydronium ions ("protons") in close proximity to high concentrations of hydroxide ions in the interior of the bipolar membrane creates a minimum energy required for the formation of a pH gradient in the bulk seawater that is inefficient for carbon dioxide extraction. Disclosed are embodiments directed to generating pH gradients in bulk liquid feed streams at low energy consumption, which facilitate efficient carbon dioxide extraction from, or storage in, seawater.

SUMMARY

Embodiments described herein are directed to a membraneless electrochemical device. The device comprises a fluid feed stream input to the membraneless electrochemical device, a first electrode, and a second electrode. The first electrode comprises a first redox-active material configured to have a proton-coupled oxidation reaction with a first portion of the fluid feed stream, and the second electrode comprises a second redox-active material configured to have a proton-coupled reduction reaction with a second portion of the fluid feed stream. The first portion and the second portion of the feed stream are separated. The device further comprises a first effluent stream comprising the first portion and having a first pH and a second effluent stream comprising the second portion and having a second pH. The second pH is different from the first pH.

Other embodiments are directed to a system. The system comprises a fluid feed stream, a membraneless electrochemical device, an energy source, a first receptable, and second receptacle, and a switching valve. The membraneless electrochemical device comprises a first electrode, a second electrode, a first effluent stream, and a second effluent stream. The first electrode comprises a first redox-active material configured to have a proton-coupled oxidation reaction with a first portion of the fluid feed stream in response to a first electrical potential, and the second electrode comprises a second redox-active material configured to have a proton-coupled reduction reaction with a second portion of the fluid feed stream in response to a first electrical potential. The first portion and the second portion are separated from each other. The first effluent stream comprises the first portion and has a first pH, and the second effluent stream comprises the second portion and has a second pH different from the first pH. The energy source is configured to apply a first electrical potential and a second, reverse electrical potential across the first and second electrodes. The first receptacle is configured to receive an effluent stream having the first pH, and the second receptacle is configured to receive an effluent stream having the second pH. The switching valve is coupled to the first and second effluent streams and the first and second receptacles.

Further embodiments are directed to a method. The method comprises flowing a fluid feed stream into a membraneless electrochemical device. The device comprises a first electrode comprising a first redox-active material and is configured to have a proton-coupled oxidation reaction when in contact with a first portion of the fluid feed stream. The device also comprises a second electrode comprising a second redox-active material and is configured to have a proton-coupled reduction reaction when in contact with a second portion of the fluid feed stream. The method includes directing the first portion of the fluid feed stream to contact the first electrode, directing the second portion of the fluid feed stream to contact the second electrode, and applying an electrical potential to the first and second electrodes. In response to applying the electrical potential, the first redox-active material on the first electrode in contact with the first portion of the fluid feed stream is oxidized, and the second redox-active material on the second electrode in contact with the second portion of the fluid feed stream is reduced. The first portion of the fluid feed stream is removed from the electrochemical device in a first effluent stream having a first pH, and the second portion of the fluid feed stream is removed from the electrochemical device in a second effluent stream having a second pH, different from the first pH.

The above summary is not intended to describe each disclosed embodiment or every implementation of the present disclosure. The figures and the detailed description below more particularly exemplify illustrative embodiments.

BRIEF DESCRIPTION OF THE DRAWINGS

The discussion below refers to the following figures, wherein the same reference number may be used to identify the similar/same component in multiple figures. However, the use of a number to refer to a component in a given figure is not intended to limit the component in another figure labeled with the same number. The figures are not necessarily to scale.

DETAILED DESCRIPTION

Fluid flow control can be used to direct different portions of a fluid stream without using a physical barrier such as a membrane. For example, fluid flow may be controlled so as to prevent, or minimize, mixing between different portions of a fluid stream. This may be achieved by controlling the laminar flow of fluid and/or by directing different portions of a stream along predetermined directions. Controlling separate portions of a fluid stream (e.g., an aqueous stream) without mixing the two portions allows for separation, and capture, of materials in the fluid stream when combined with electrolysis. For example, a target component such as a molecule or solute in the fluid stream may be captured by acidifying a portion of the fluid stream to release the target molecule or solute.

Creation of a pH gradient in the fluid stream at two discrete electrodes rather than at a boundary within a bipolar membrane, and independently maintaining the separation of the acidified portion of the stream, i.e., absent a membrane or physical barrier, reduces the energy and costs required to perform and maintain the separation. Without a membrane, the electrochemical device, or cell, has fewer parts thereby reducing manufacturing costs. The lack of a membrane also allows for the electrochemical cell to be used with fluids (i.e., electrolytes) having a wider range of pH values which also allows for construction with a wider variety (e.g., less expensive) materials. For example, an electrochemical device with an input fluid stream (i.e., electrolyte) with an extremely high or low pH may avoid needing materials designed to resist corrosion. Moreover, removal of a membrane from an electrochemical separation cell removes issues related to durability, fouling, and resilience to components in the electrolyte. A membraneless system also opens up design paradigms where at least some of the components of the electrochemical cell are designed to be inexpensive and/or disposable, or otherwise replaceable at periodic or predetermined intervals. Various systems involving membraneless electrochemical cells that generate a pH gradient are described further herein.

Figure 1:
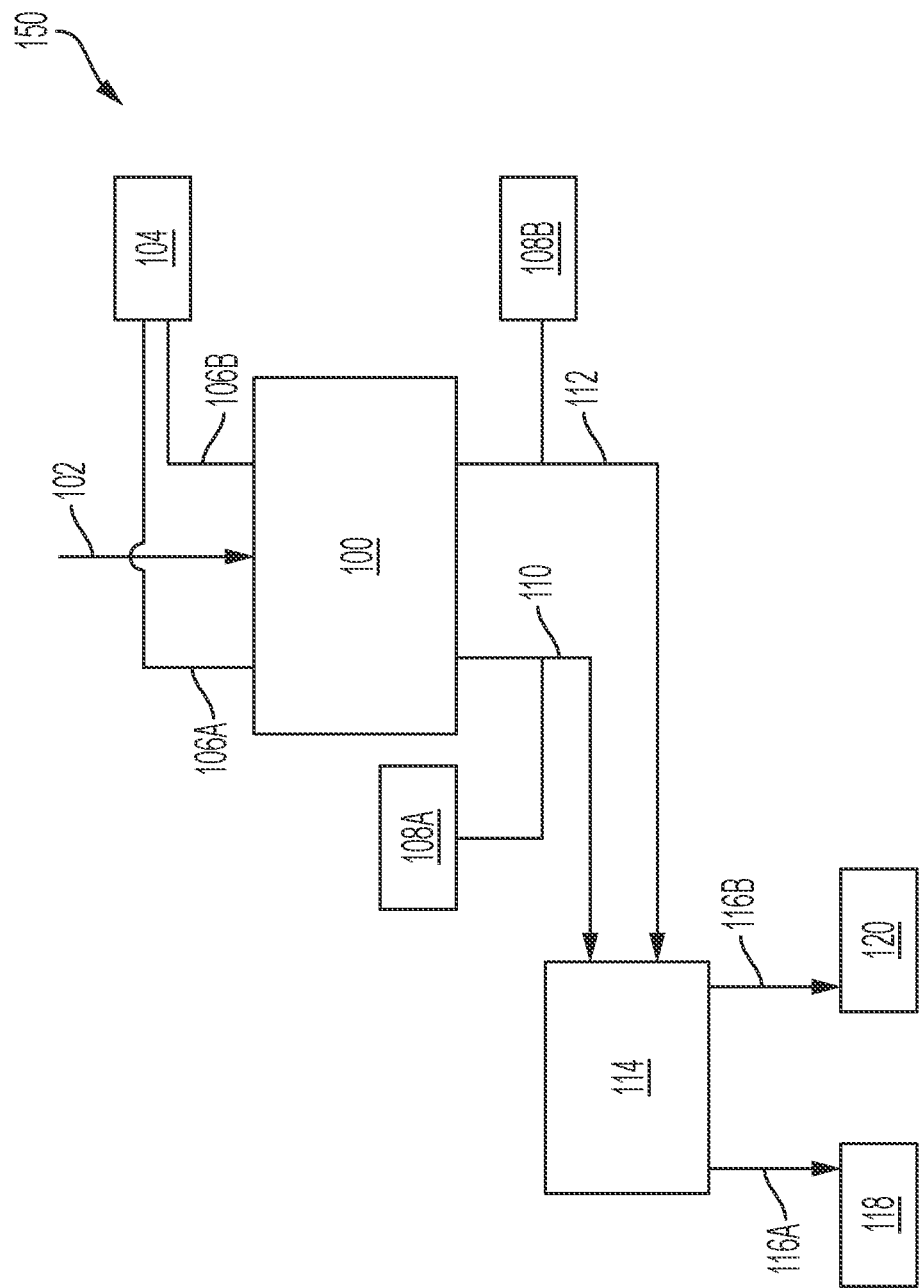
FIG. 1 is a block diagram of a system including a membraneless electrochemical device to capture a target molecule or solute using a pH gradient in accordance with certain embodiments.

Turning to FIG. 1, a system 150 is illustrated that utilizes a membraneless electrochemical cell 100 to separate components from an input fluid stream 102 by generating a pH gradient in the fluid stream. A fluid stream (e.g., an aqueous stream) is input to a membraneless electrochemical cell comprising two electrodes, each of which comprises a redox-active material. The input stream 102 includes at least one target molecule or solute that may be captured as a result of operation of the membraneless electrochemical cell. The term "membraneless electrochemical cell" as used herein refers to an electrochemical cell that does not include a membrane, or other non-porous or ion-selective barrier, positioned between the two electrodes. For example, in certain embodiments a membraneless electrochemical cell may include a mesh or porous separator interposed between the electrodes. The electrodes of the electrochemical cell 100 are coupled to an energy source 104 that supplies a voltage to the first electrode through coupling 106A and to the second electrode through coupling 106B to apply an electrical potential across the electrodes.

When the electrical potential is applied across the electrodes, redox-active material of the first electrode undergoes a first proton-coupled faradaic reaction with the electrolyte (e.g., water), and the redox-active material of the second electrode undergoes a second proton-coupled faradaic reaction with the electrolyte (e.g., water), such that hydroxide ions are produced or hydronium ions are absorbed proximate the first electrode, and hydronium ions are produced or hydroxide ions are absorbed proximate the second electrode. In addition, the first and second redox-coupled reactions may also move ions (e.g., simultaneously) that are not hydroxide or hydronium ions, such as sodium ions or chloride ions. As a result, a first portion of the input stream proximate the first electrode has a different pH value than a second portion of the input stream proximate the second electrode, creating a pH gradient within the membraneless electrochemical cell. While the pH gradient is relative to the incoming pH of the feed stream 102, example gradient values may include a range of about 1 to 2 pH units, or about 2 to 4 pH units, or about 4 to 6 pH units. The pH gradient does not have to be centered around the incoming pH of the feed stream. For example, two output streams at a pH of 5 and a pH of 9 are possible with a feed stream having a pH of 8.

To prevent mixing and neutralizing the pH gradient, the first and second portions are kept separated in the membraneless electrochemical cell through controlled and/or directed fluid flow as described herein further below. A first, acidic portion of the input stream is removed from the membraneless electrochemical cell as stream 110, and a second, alkaline portion of the input stream is removed from the membraneless electrochemical cell as stream 112. The terms "acidic" and "alkaline" as used herein are defined relative to the initial, incoming pH of the input stream 102. A first pH measuring device 108A is coupled to stream 110, and a second pH measuring device 108B is coupled to stream 112. In certain embodiments a single pH measuring device is configured to measure the pH of each of the effluent streams 110, 112.

The effluent streams 110 and 112 are discharged to separate storage receptacles to keep the streams from neutralizing. In certain embodiments, the first effluent stream 110 is diverted to receptacle 118, and the second effluent stream 112 is diverted to receptacle 120. While receptacles 118 and 120 are referred to as storage receptacles, they may also represent discharge from the system or a subsequent processing stage. For example, in certain embodiments, at least one of the receptacles (e.g., 118, comprising the acidic effluent) includes reactants to further react with the acidic effluent and separate the target molecule or solute from effluent stream 110.

Since the electrolyte has faradaic reactions with the respective electrodes, the electrochemical cell is also operated at times by applying a reverse electrical potential across the electrodes. The reverse potential may be applied as needed, or on a predetermined schedule. The reverse potential has the effect of cycling the redox-active materials on the first and second electrodes, such that they are restored to the state before the forward potential was applied. When the reverse potential is applied, the electrodes exchange reactions with the electrolyte such that hydroxide ions are absorbed or hydronium ions are produced proximate the first electrode, and hydronium ions are absorbed or hydroxide ions are produced proximate the second electrode.

The first and second portions of the input stream still create a pH gradient and are kept separated in the membraneless electrochemical cell, but the pH gradient is reversed. Thus, if the effluent stream 110 had a lower pH value when the first potential was applied, effluent stream 110 would have a higher pH value when the reverse potential is applied. Likewise, if the effluent stream 112 had a higher pH value when the first potential was applied, effluent stream 112 would have a lower pH value when the reverse potential is applied.

Because the pH values of the respective effluent streams change based on the applied potential, a switching valve 114 is coupled to both effluent streams 110, 112. For example, if a first potential is applied and effluent stream 110 has a lower pH, stream 110 is diverted to receptacle 118 through path 116A, but when the reverse potential is applied, effluent stream 110 would have a higher pH and the switching valve would activate to divert effluent stream 110 through path 116B to receptacle 120. Likewise, if a first potential is applied and effluent stream 112 has a higher pH, stream 112 is diverted to receptacle 120 through path 116B, but when the reverse potential is applied, effluent stream 112 would have a lower pH and the switching valve would activate to divert effluent stream 112 through path 116A to receptacle 118 to keep the effluent from neutralizing in the receptacles 118, 120. To create and maintain the pH gradient in the membraneless electrochemical cell, the first and second portions of the input stream are kept separate as discussed in more detail below.

In certain embodiments, system 150 may be used to separate carbon dioxide from seawater. In such embodiments, the input stream 102 is seawater comprising bicarbonate and carbonate ions, among other dissolved electrolytes. The acidified seawater that exits cell 100 and is directed to storage receptacle 118 contains a higher concentration of carbonic acid according to the carbonic acid/bicarbonate/carbonate equilibrium. Carbon dioxide can be stripped from this acidified seawater through a number of methods including vacuum or thermal evaporation. In other embodiments, the acidified seawater is directed to a mixing tank (e.g., receptacle 118 or another optional receptacle) optionally equipped with a stirring mechanism, into which a carbon-containing base material (e.g., carbonate-rich minerals, such as calcium carbonate, and including bicarbonates such as $NaHCO_3$ and carbonic acid) is added. The reactant reacts with the seawater to produce gaseous $CO_2$ and reduce the acidity. In some embodiments, the carbon-containing base material is formed by reaction of outside seawater with the higher pH stream 112.

In alternative embodiments, the base material reacts with the acidified stream to neutralize the acid so that the neutralized effluent may be discharged (e.g., returned to the ocean), and the other, alkaline effluent, stream is used for carbon capture. In these embodiments, a wider variety of base materials can be used, including carbonates/bicarbonates, silicates, hydroxides, and oxides, or minerals rich in these components. The basic solution/effluent can be discharged to the ocean, where it increases the alkalinity, causing the ocean to take in $CO_2$ from the atmosphere. In other embodiments, the basic effluent stream can take up $CO_2$ by being exposed to, or coming into contact with, a more concentrated stream of $CO_2$, e.g., flue gas from power generation or a ship's exhaust, or $CO_2$ captured from the air through direct air capture.

The separated target molecule or solute (here, for example, carbon dioxide) does not have to be physically separated from the effluent streams. The target component can be reacted with a chemical reagent to convert the target molecule or solute into a different, more benign form. For example, if the target molecule is carbon dioxide and calcium carbonate is introduced into and reacted with the acidified stream, the calcium carbonate would react with dissolved carbon dioxide according to the formula $CaCO_3 + H_2CO_3 \rightarrow Ca(HCO_3)_2$. Thus, separation of the target molecule or solute may be considered as removal of that component in the target molecule or solute form from one or more effluent streams.

In certain other embodiments, system 150 may be used to desalinate seawater or other electrolyte solutions. This is accomplished by selecting a redox couple such as bismuth/bismuth oxychloride (Bi/BiOCl), wherein redox cycling moves both protons (or hydroxide) and salt ions together (e.g., simultaneously). In this case, one effluent stream is desalinated while the other effluent stream is concentrated in salt. The desalinated stream can be the stream with lower pH, or it can be the stream with the higher pH. Conversely, the concentrated stream can also be the stream with the higher pH, or it can be the stream with the lower pH.

Figure 2:
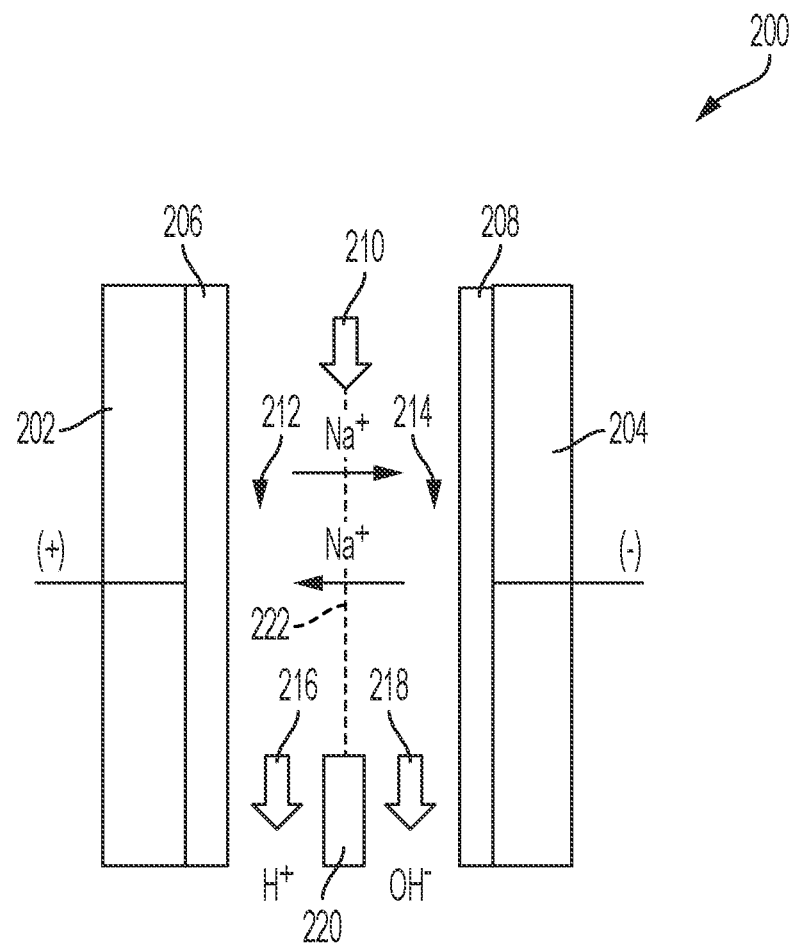
FIG. 2 is a schematic diagram of a laminar membraneless electrochemical cell in accordance with certain embodiments.

FIG. 2 illustrates certain embodiments of a membraneless electrochemical cell, referred to herein as a laminar membraneless electrochemical cell 200. The laminar cell 200 includes a first electrode 202 comprising a first redox-active material 206 and a second electrode 204 comprising a second redox-active material 208 positioned opposite the first electrode. The first electrode 202 and the second electrode 204 may also be wholly constituted of the respective redox-active materials 206, 208. In this case 206, 208 should be understood as the electrodes for laminar membraneless electrochemical cell 200. In certain embodiments, the first and second redox-active materials 206, 208 are materials that make up the same redox couple such as Bi/BiOCl or benzoquinone/hydroquinone. In other embodiments, the first and second redox-active materials 206, 208 may be the same or different. The redox-active material 206, 208 may also be at least one of a quinone, a phenazine, a pyrazine, a quinoxaline, or a derivative thereof. The redox-active material may also be at least one of an ionomer and a polymer, wherein the at least one of the ionomer and polymer comprises at least one of a quinone, a phenazine, a pyrazine, a quinoxaline, and a derivative thereof. The redox-active material 206, 208 is selected based on several factors including ease of production, relative abundance and availability, cost price, redox kinetics, oxygen stability in either redox state, water stability in either redox state, and chemical compatibility with the pH of the input stream 210 or any of the solutes dissolved therein.

In certain embodiments the redox-active material 206, 208 is coated onto the electrode 202, 204, as shown in FIG. 2. However, in alternative embodiments, the redox-active material 206, 208 is an organic molecule grafted onto and/or into the electrode, 202, 204. For example, one or both of the electrodes 202, 204 may comprise the redox-active material 206, 208 and at least one of a conductive material, a binder, and a conductive binder. The electrodes 202, 204 are positioned opposite each other with a gap between them. The gap is determined by one or more of the laminar flow characteristics of liquid inside the laminar cell 200, the input and output flow rates, the electrode kinetics, and the presence or absence of an intervening porous separator 222. If an intervening porous separator 222 is present, it may be flat or have integrated flow channels. There may be pressure applied to the intervening porous separator 222 from an external compression to the laminar cell 200, and the pressure directed through the first and second electrodes 202, 204. The electrodes 202, 204 themselves may also be flat or have integrated flow channels.

In a laminar membraneless electrochemical cell 200, the input fluid stream, indicated by arrow 210, flows into the cell 200 substantially parallel to the first and second electrodes 202, 204 so that the input fluid stream 210 is in contact with major and opposing surfaces of each of the electrodes 202, 204 as shown in FIG. 2. Thus, the laminar flow of the input stream 210 may be considered as layers or portions flowing in the same direction indicated by arrow 210. For example, a first portion 212 or laminar flow may be proximate the first electrode 202 and a second portion 214 or laminar flow may be proximate the second electrode 206. When an electrical potential is applied across the electrodes 202, 204, the redox-active materials 206, 208 of the electrodes have proton-coupled faradaic reactions with the electrolyte proximate the electrodes 202, 204. For example, hydroxide ions are absorbed or hydronium ions are produced proximate the first electrode 202 thereby increasing the acidity of the first portion 212, and hydronium ions are absorbed or hydroxide ions are produced proximate the second electrode 204 thereby increasing the alkalinity of the second portion 214.

The laminar flow of both the first and second portions is controlled to minimize, or reduce, mixing between and maintain the acidic first portion 212 proximate the first electrode 202 and the alkaline second portion 214 proximate the second electrode 204 as the separate portions flow through the cell 200. For example, the flow may be controlled by one or more pumps positioned at the input or outputs of the laminar membraneless electrochemical cell 200. Further, if present, integrated flow channels in one or both of the electrodes 202, 204 assist in directing the laminar flow of the first and second portions 212, 214 as well as increase the electrode surface area for the redox reactions.

As the first and second portions 212, 214 exit the laminar membraneless electrochemical cell 200, they are separated by a physical barrier 220 (e.g., a nonpermeable wall) to maintain the separation of the different pH streams. As shown, the first effluent stream 216 has a lower pH and the second effluent stream 218 has a higher pH. The effluent streams may then be diverted as discussed above with respect to system 150.

Figure 3:
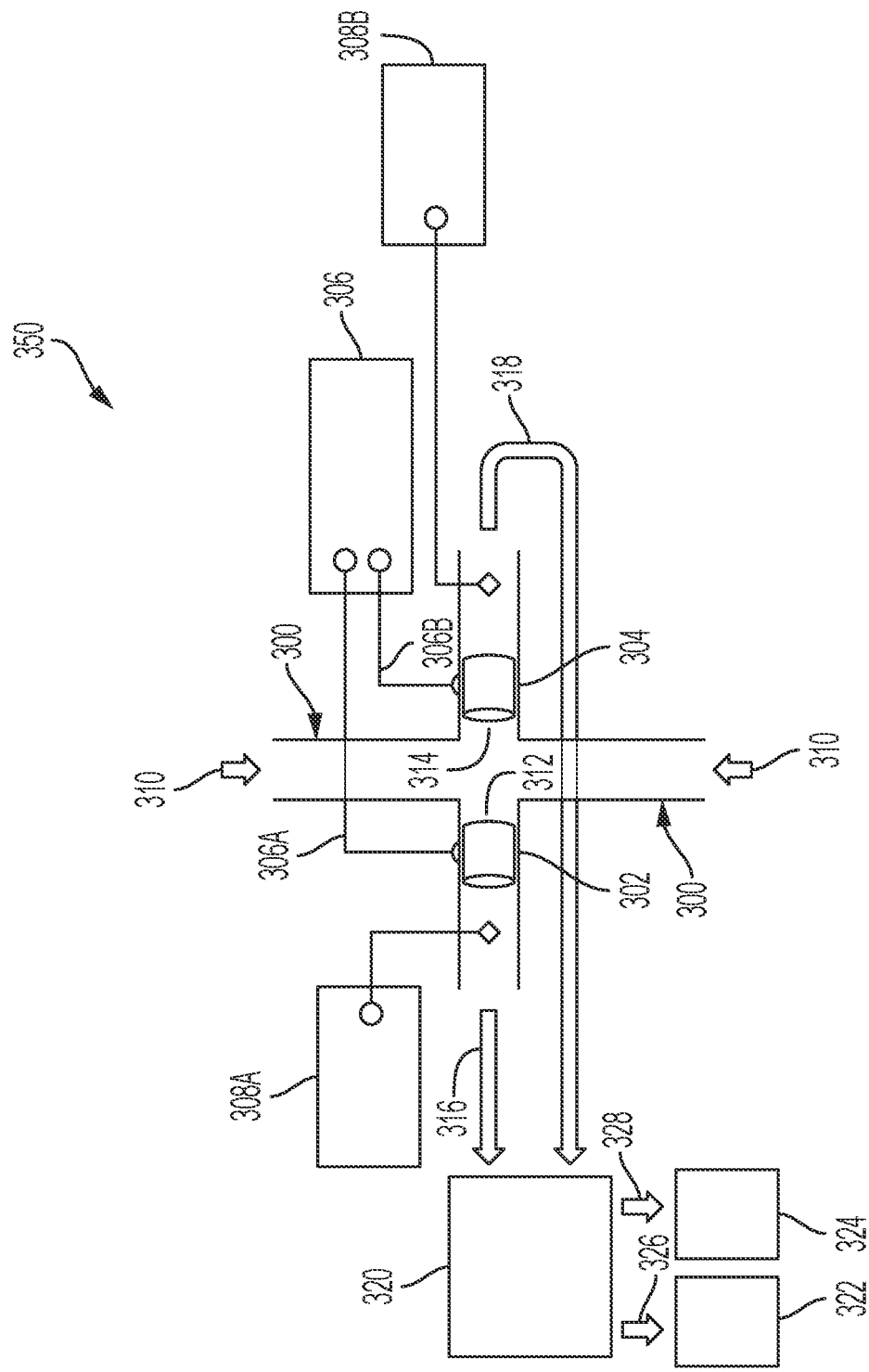
FIG. 3 is a block diagram of a system including a flow-through membraneless electrochemical cell in accordance with certain embodiments.

FIG. 3 illustrates various embodiments of a system 350 that utilizes a membraneless electrochemical cell, referred to herein as a flow-through membraneless electrochemical cell 300. The flow-through cell 300 includes a first, permeable electrode 302 comprising a first redox-active material and a second, permeable electrode 304 comprising a second redox-active material positioned opposite the first electrode 302 where the input feed stream flows through the respective electrodes 302, 304. As set forth above, the electrodes 302, 304 may comprise the same redox-active materials with one or more of a conductive material, a binder, and a conductive binder. Also as above, the redox-active material may be coated onto the electrode or grafted onto or into the electrodes.

In a flow-through membraneless electrochemical cell 300, the input fluid stream, indicated by arrows 310, flows into the cell 300 in a first direction and is then diverted in an orthogonal direction through the opposing electrodes 302, 304 as shown in FIG. 3. While the input is shown as two, opposing streams, a single input stream may also be used. As with the laminar membraneless electrochemical cell discussed above, when an electrical potential is applied across the electrodes, the redox-active materials of the electrodes 302, 304 have proton-coupled faradaic reactions with the electrolyte proximate the electrodes 302, 304. For example, hydroxide ions are absorbed or hydronium ions are produced proximate the first electrode 302 thereby increasing the acidity of the first portion 312, and hydronium ions are absorbed or hydroxide ions are produced proximate the second electrode 304 thereby increasing the alkalinity of the second portion 314.

The flow through each of the first and second electrodes 302, 304 is controlled to maintain the acidic first portion 312 proximate the first electrode 302 separate from the alkaline second portion 314 proximate the second electrode 304 as the separate portions exit the cell 300 through separate and opposing pathways 316, 318. The flow may, for example, be controlled by one or more pumps positioned at one or more inputs or outputs of the flow-through membraneless electrochemical cell 300. The separate pathways 316, 318 maintain the separation of the different pH streams where, for example, the first effluent stream 316 may have a lower pH and the second effluent stream 318 may have a higher pH. As discussed above, the walls of the flow-through cell 300 may also include flow channels and/or an intervening porous separator. The flow-through electrochemical cell 300 is shown as part of a separation system 350.

The separation system 350 couples the first and second electrodes 302, 304 to an energy source 306 that supplies a voltage to the first electrode 306A and to the second electrode 306B to apply an electrical potential across the electrodes 302, 304. As discussed above, the energy source 306 is configured to apply a first electrical potential as well as a reverse potential to the cell 300. A first pH measuring device 308A is coupled to effluent stream 316, and a second pH measuring device 308B is coupled to effluent stream 318. In certain embodiments a single pH measuring device is configured to measure the pH of each of the effluent streams 316, 318.

The effluent streams 316 and 318 are discharged to separate storage receptacles to keep the streams from neutralizing. In certain embodiments, the first effluent stream 316 is diverted to receptacle 322 via pathway 326, and the second effluent stream 318 is diverted to receptacle 324 via pathway 328. While receptacles 322 and 324 are referred to as storage receptacles, they may also represent discharge from the system or a subsequent processing stage. For example, in certain embodiments, at least one of the receptacles (e.g., 322 comprising an acidic effluent) includes reactants to further react with the acidic effluent and separate a target molecule or solute from effluent stream 316. As set forth above, a switching valve 320 controls the output of the effluent streams 316, 318 based on the applied potential across the electrodes to switch the effluent stream carried by pathways 326, 328. In other embodiments, the acidified seawater is directed to a mixing tank optionally equipped with a stirring mechanism, into which one or more reactants (e.g., calcium carbonate) is added and allowed to react with the seawater thereby reducing the acidity of the effluent.

Figure 4:
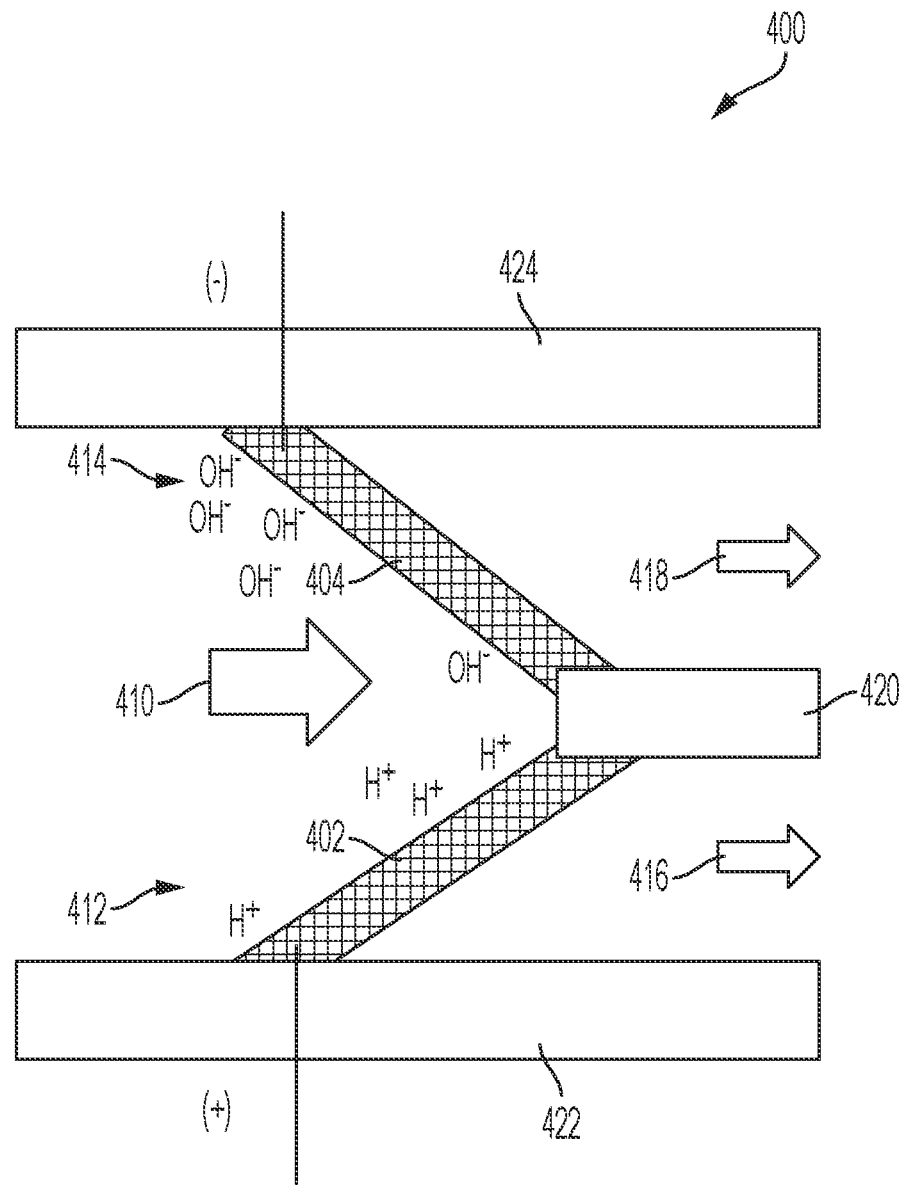
FIG. 4 is a schematic diagram of a flow-through membraneless electrochemical cell in accordance with certain embodiments.

FIG. 4 illustrates an alternative embodiment of a flow-through membraneless electrochemical cell 400. The cell 400 is similar to that of FIG. 3 with the exception of the positioning of the first and second permeable, or porous, electrodes. While the porous electrodes could be positioned in a variety of configurations, in the flow-through cell 400, the electrodes 402, 404 are positioned at an angle converging toward each other—not in opposition. The first electrode 402 extends from a first wall 422 of the cell 400 toward an interior, impermeable wall 420, while the second electrode 404 extends from a second wall 424 of the cell 400 toward wall 420. When an electrical potential is applied to the first and second electrodes 402, 404, hydroxide ions are absorbed or hydronium ions are produced proximate the electrode where a proton-coupled oxidation reaction is taking place, and hydronium ions are absorbed or hydroxide ions are produced proximate the electrode where a proton-coupled reduction reaction is taking place.

There is no non-porous membrane or physical barrier at the input of the feed stream. However, as discussed above, the walls 422, 424 of the flow-through cell 400 may also include flow channels proximate the input and/or electrodes 402, 404 and/or an intervening porous separator to assist in directing the flow through the cell 400. After a first portion 412 of the feed stream 410 passes through the first electrode 402 it is separated from the second portion 414 that passes through the second electrode 404 by wall 420. The effluent streams 416, 418 may then be stored, processed, and/or discharged as discussed above.

Figure 5:
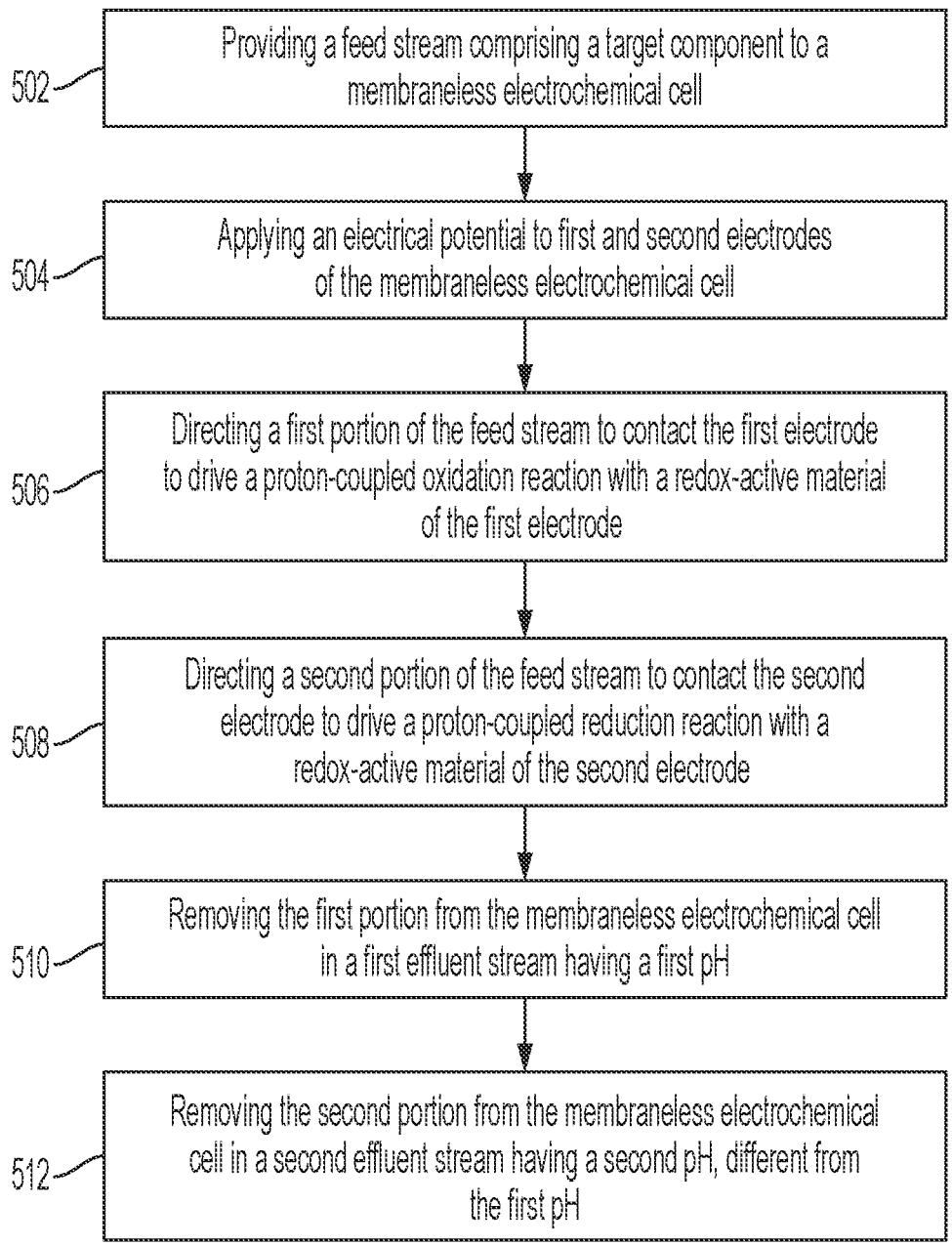
FIGS. 5-6 are flow diagrams of methods in accordance with certain embodiments.

Methods for creating a pH gradient using the membraneless electrochemical cells described above are described in FIGS. 5 and 6. FIG. 5 illustrates a first half cycle operation of a membraneless electrochemical cell. The method includes providing a feed stream to the membraneless electrochemical cell 502. The feed stream may be aqueous and include at least one target molecule or solute to be separated from the stream. An electrical potential is applied across the first and second electrodes 504. For example, the first electrode is charged as the anode and the second electrode is charged as the cathode. A first portion of the feed stream is directed to contact the first electrode (as described above in various membraneless electrochemical cell embodiments) to drive a proton-coupled oxidation reaction with a redox-active material of the first electrode in the first portion of the feed stream 506. The oxidation reactions increase the acidity of the first portion of the feed stream thereby lowering the pH value of the first portion proximate the first electrode. A second portion of the feed stream is directed to contact the second electrode (as described above in various membraneless electrochemical cell embodiments) to drive a proton-coupled reduction reaction with a redox-active material of the second electrode 508. The reduction reactions increase the alkalinity of the second portion of the feed stream thereby raising the pH value of the second portion proximate the second electrode. Thus, the applied potential across the electrodes creates a pH gradient within the feed stream in the electrochemical cell.

The acidic and alkaline portions of the feed stream at opposing electrodes are then separately removed from the membraneless electrochemical cell. The first portion of the feed stream is removed in a first effluent stream having a first pH 510, and the second portion of the feed stream is removed in a second effluent stream having a second pH 512. As set forth above, the first and second pH values are different. For example, the first pH is lower (i.e., more acidic) than the feed stream and the second pH; likewise, the second pH is higher (i.e., more alkaline) than the feed stream and the first pH. As described in more detail above, the first and second effluent streams may be stored separately and/or further processed to capture or utilize target components.

Figure 6:
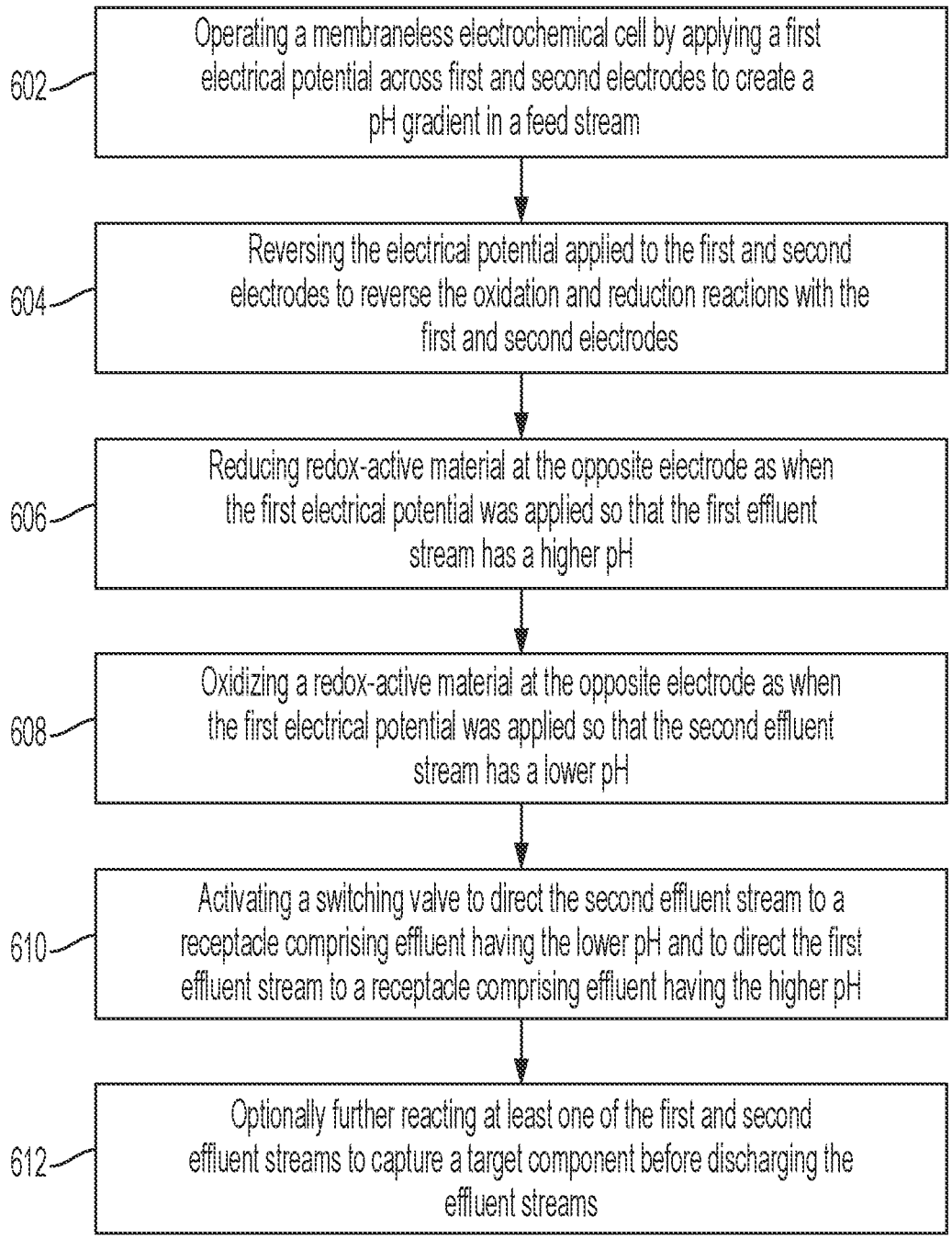

Due to the faradaic reactions at the electrodes in the membraneless electrochemical cell, which impose a charge capacity limit on the redox-active materials at the electrodes, the potential applied across the electrodes is periodically reversed. Here, periodically may refer to either reversing the potential once in a while on an as-needed basis, or reversing the potential on a set schedule. The durations and the electrical potentials of the reversals do not have to be equal to those during forward, un-reversed, operation. FIG. 6 illustrates a second half cycle operation complementing the half cycle illustrated in FIG. 5.

The method of FIG. 6 includes operating the membraneless electrochemical cell as set forth above in FIG. 5 to generate a pH gradient in the feed stream 602. However, the electrical potential applied across the first and second electrodes is reversed such that the first electrode is now charged as the cathode and the second electrode is charged as the anode 604. A first portion of the feed stream is still directed to contact the first electrode (as described above in various embodiments) but for this half cycle, it drives a proton-coupled reduction reaction with the redox-active material of the first electrode thereby raising the pH and alkalinity of the first portion of the feed stream proximate the first electrode to about the second pH value 606 discussed above in connection with FIG. 5. A second portion of the feed stream is directed to contact the second electrode (as described above in various embodiments) to drive a proton-coupled oxidation reaction with the redox-active material of the second electrode thereby increases the acidity of the second portion of the feed stream and lowering the pH value of the second portion proximate the second electrode to about the first pH value 608 discussed above in connection with FIG. 5. Thus, the applied potential across the electrodes creates a pH gradient opposite that of the method of FIG. 5 within the feed stream in the membraneless electrochemical cell.

The acidic and alkaline portions separated at the opposing electrodes are then separately removed from the membraneless electrochemical cell. However, in the reverse half cycle, the first portion of the feed stream is removed in the first effluent stream having the second pH, and the second portion of the feed stream is removed in the second effluent stream having the first pH. To maintain the separation of the effluent streams with differing pH values, a switching valve is coupled to the effluent streams downstream from the membraneless electrochemical cell.

During the reverse half cycle operation of the electrochemical cell, the switching valve is activated to switch the effluent streams so that the streams are delivered to the storage receptacle with the same, or approximately the same, pH 610. For example, if the first effluent stream is stored in a first storage tank during the half cycle of FIG. 5, the second effluent stream is diverted to be stored in the first storage tank during the reverse half cycle of FIG. 6 to keep streams with similar pH values together. In certain embodiments, one or both of the stored effluent streams are further processed by further reacting the streams to capture a target molecule or solute 612. For example, the low pH effluent may be reacted with a carbonate-rich mineral, as discussed above, to capture carbon dioxide from the effluent.

As set forth above, various embodiments directed to membraneless electrochemical cells may be used to create pH gradients that may be used to separate and/or capture components of a target molecule or solute. Without a membrane, the electrochemical cells have increased durability and can generate a pH gradient while consuming a low amount of energy. These membraneless electrochemical cells may be used, for example, to remove carbon dioxide from seawater or for desalination.

In all cases described herein, the redox-active materials on the electrodes should be understood to include not just one oxidation state, whether fully reduced or fully oxidized, but also any intermediate state of charge of the redox couple. For example, an electrode that is coated with 1:1 molar ratio of bismuth and bismuth oxychloride is considered to be at a fifty-percent state of charge, and for the purposes of this invention, should be considered to be coated with one kind of redox-active material. As another example, an electrode that is coated with a polymer containing redox-active quinone moieties would be considered to comprise one type of redox-active material, whether all the quinone moieties on the polymer are in their reduced states, oxidized states, or any combination thereof. Two electrodes having different states of charge of the same redox couple are understood to comprise the same redox active material.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description has been presented for the purposes of illustration and description. It is not intended to be exhaustive or to limit the embodiments to the precise form disclosed. It is also not intended to limit the embodiments to aqueous inks or inks that contain water. Many modifications and variations are possible in light of the above teachings. Any or all features of the disclosed embodiments can be applied individually or in any combination and are not meant to be limiting, but purely illustrative. It is intended that the scope of the invention be limited not with this detailed description, but rather, determined by the claims appended hereto.

What is claimed is:

1. A membraneless electrochemical device, comprising:
   a fluid feed stream input to the membraneless electrochemical device;
   a first electrode comprising a first redox-active material configured to have a proton-coupled oxidation reaction with a first portion of the fluid feed stream;
   a second electrode comprising a second redox-active material configured to have a proton-coupled reduction reaction with a second portion of the fluid feed stream, wherein the first portion and the second portion are separated;
   a first effluent stream comprising the first portion and having a first pH, wherein the first pH is the pH value of the first effluent stream;
   a second effluent stream comprising the second portion and having a second pH different from the first pH, wherein the second pH is the pH value of the second effluent stream;
   a first receptacle configured to receive an effluent stream having the first pH;
   a second receptacle configured to receive an effluent stream having the second pH; and
   a switching valve coupled to the first and second effluent streams and the first and second receptacles.

2. The membraneless electrochemical device of claim 1, wherein at least one of the first and second redox-active materials is coated on at least one of the first or second electrodes.

3. The membraneless electrochemical device of claim 1, wherein at least one of the first and second redox-active materials is a polymer grafted onto at least one of the first or second electrodes.

4. The membraneless electrochemical device of claim 1, wherein the first redox-active material and the second redox-active material are the same.

5. The membraneless electrochemical device of claim 1, wherein at least one of the first and second redox-active materials is at least one of a quinone, a phenazine, a pyrazine, a quinoxaline, and a derivative thereof, or at least one of the first and second redox-active materials is at least one of an ionomer and a polymer, wherein the at least one of the ionomer and polymer comprises at least one of a quinone, a phenazine, a pyrazine, a quinoxaline, and a derivative thereof.

6. The membraneless electrochemical device of claim 1, wherein each of the first and second electrodes comprises at least one of a conductive material, a binder, and a conductive binder.

7. The membraneless electrochemical device of claim 1, wherein the fluid feed stream flows parallel to a first surface of the first electrode and to a first surface of the second electrode, wherein the first surfaces face each other and are separated by a gap of a predetermined distance.

8. The membraneless electrochemical device of claim 1, wherein the first and second electrodes are porous and positioned opposing each other and the first portion of the fluid feed stream flows through the first electrode and the second portion of the fluid feed stream flows through the second electrode.

9. The membraneless electrochemical device of claim 1, wherein the first and second electrodes are porous.

10. The membraneless electrochemical device of claim 1, wherein the first and second electrodes are coupled to an energy source configured to drive the proton-coupled oxidation reaction with the first redox-active material and the proton-coupled reduction reaction with the second redox-active material when an electrical potential is applied across the first and second electrodes, and configured to drive a proton-coupled reduction reaction with the first redox-active material and a proton-coupled oxidation reaction with the second redox-active material when the electrical potential applied across the first and second electrodes is reversed so that the first effluent stream has the second pH, wherein the second pH is the pH value of the second effluent stream before the electrical potential applied across the first and the second electrodes is reversed, and the second effluent stream has the first pH, wherein the first pH is the pH value of the first effluent stream before the electrical potential applied across the first and the second electrodes is reversed.

11. The membraneless electrochemical device of claim 1, wherein the fluid feed stream comprises a target component.

12. The membraneless electrochemical device of claim 11, wherein the target component is carbon dioxide.

13. The membraneless electrochemical device of claim 11, wherein the target component is a salt.

14. A system comprising:
   a fluid feed stream;
   a membraneless electrochemical device, comprising:

a first electrode comprising a first redox-active material configured to have a proton-coupled oxidation reaction with a first portion of the fluid feed stream in response to a first electrical potential across the first electrode and a second electrode;

the second electrode comprising a second redox-active material configured to have a proton-coupled reduction reaction with a second portion of the fluid feed stream in response to the first electrical potential, wherein the first portion and the second portion are separated;

a first effluent stream comprising the first portion and having a first pH, wherein the first pH is the pH value of the first effluent stream;

a second effluent stream comprising the second portion and having a second pH different from the first pH, wherein the second pH is the pH value of the second effluent stream;

an energy source configured to apply the first electrical potential and a second, reverse electrical potential across the first and second electrodes;

a first receptacle configured to receive an effluent stream having the first pH;

a second receptacle configured to receive an effluent stream having the second pH; and a switching valve coupled to the first and second effluent streams and the first and second receptacles.

15. The system of claim 14, wherein the first receptacle comprises a base material configured to react with the effluent stream having the first pH to increase the pH of the effluent stream to a third pH before the effluent stream is discharged.

16. The system of claim 14, wherein the fluid feed stream comprises a target molecule or solute and the first receptacle comprises a base material configured to react with the effluent stream having the first pH to separate the target molecule or solute before the effluent stream is discharged.

17. The system of claim 14, wherein the second effluent stream is processed to absorb and capture carbon dioxide by reacting the second effluent stream with carbon dioxide.

18. The system of claim 14, wherein the switching valve is configured to direct the first effluent stream to the first receptacle and the second effluent stream to the second receptacle when the energy source applies the first electrical potential across the first and second electrodes, and is configured to direct the second effluent stream to the first receptacle and the first effluent stream to the second receptacle when the energy source applies the second, reverse electrical potential across the first and second electrodes.

19. The system of claim 14, wherein the fluid feed stream flows parallel to a first surface of the first electrode in the membraneless electrochemical device and parallel to a first surface of the second electrode in the membraneless electrochemical device, wherein the first surfaces face each other and are separated by a gap of a predetermined distance.

20. The system of claim 14, wherein the first and second electrodes of the membraneless electrochemical device are porous and the first portion of the fluid feed stream flows through the first electrode and the second portion of the fluid feed stream flows through the second electrode.

* * * * *